United States Patent
Tran et al.

(10) Patent No.: US 10,854,240 B1
(45) Date of Patent: Dec. 1, 2020

(54) METHOD OF CLEANING MAGNETIC HEAD SLIDERS

(71) Applicant: Seagate Technology LLC, Cupertino, CA (US)

(72) Inventors: Binh Dinh Tran, St. Paul, MN (US); Phillip Andrew Grothe, Carver, MN (US)

(73) Assignee: SEAGATE TECHNOLOGY LLC, Fremont, CA (US)

(*) Notice: Subject to any disclaimer, the term of this patent is extended or adjusted under 35 U.S.C. 154(b) by 195 days.

(21) Appl. No.: 15/712,736

(22) Filed: Sep. 22, 2017

Related U.S. Application Data

(62) Division of application No. 13/780,461, filed on Feb. 28, 2013, now abandoned.

(51) Int. Cl.
  *B08B 7/00* (2006.01)
  *G11B 23/50* (2006.01)
(52) U.S. Cl.
  CPC .................................. *G11B 23/50* (2013.01)
(58) Field of Classification Search
  CPC .................................................. H01L 21/67034
  See application file for complete search history.

(56) References Cited

U.S. PATENT DOCUMENTS

| | | | |
|---|---|---|---|
| 3,855,625 A | 12/1974 | Garnier et al. | |
| 4,100,643 A | 7/1978 | Horian et al. | |
| 5,325,566 A * | 7/1994 | Jahani | B08B 1/02 15/21.1 |
| 5,335,458 A | 8/1994 | Stoffers et al. | |
| 5,607,340 A * | 3/1997 | Lackey | B24B 37/048 29/603.16 |
| 6,067,211 A | 5/2000 | Chliwnyj et al. | |
| 6,609,529 B2 | 8/2003 | Olim | |
| 6,777,642 B2 | 8/2004 | Song et al. | |
| 6,913,509 B2 * | 7/2005 | Sone | B24B 37/048 29/603.16 |
| 7,059,005 B2 | 6/2006 | Wong et al. | |
| 7,258,151 B2 * | 8/2007 | Nomura | B24B 37/048 156/499 |
| 8,066,547 B1 * | 11/2011 | Schuh | B24B 37/048 451/1 |
| 8,211,846 B2 | 7/2012 | Mui et al. | |

(Continued)

FOREIGN PATENT DOCUMENTS

| | | |
|---|---|---|
| CN | 1440550 A | 9/2003 |
| CN | 101028624 A | 9/2007 |

(Continued)

OTHER PUBLICATIONS

Office Action dated Apr. 1, 2019, issued by Thailand Patent Office for Application No. 1401001030, filed Feb. 27, 2014.

(Continued)

*Primary Examiner* — Alexander Markoff
(74) *Attorney, Agent, or Firm* — Holzer Patel Drennan

(57) ABSTRACT

A method for cleaning magnetic sliders. One embodiment of the method includes dislodging particulate debris from a surface of a magnetic slider by contacting the surface of the slider with an oscillating brush, enveloping the dislodged particulate debris in a foam, and removing the enveloped particulate debris by removing the foam from the magnetic slider.

18 Claims, 4 Drawing Sheets

(56) References Cited

U.S. PATENT DOCUMENTS

| | | | |
|---|---|---|---|
| 9,406,325 B2* | 8/2016 | Johnson | G11B 5/41 |
| 2002/0048118 A1 | 4/2002 | Tanaka et al. | |
| 2003/0019068 A1 | 1/2003 | Field et al. | |
| 2003/0070697 A1 | 4/2003 | Field et al. | |
| 2003/0084919 A1 | 5/2003 | Tai et al. | |
| 2005/0066996 A1* | 3/2005 | France | A46B 9/028 |
| | | | 134/6 |
| 2005/0133061 A1 | 6/2005 | de Larious et al. | |
| 2005/0199265 A1* | 9/2005 | France | A46B 9/00 |
| | | | 134/6 |
| 2007/0135321 A1 | 6/2007 | Patel et al. | |
| 2008/0087298 A1 | 4/2008 | Katou et al. | |
| 2009/0241998 A1 | 10/2009 | Kesil et al. | |

FOREIGN PATENT DOCUMENTS

| | | |
|---|---|---|
| CN | 101610980 A | 12/2009 |
| CN | 101903986 A | 12/2010 |
| JP | 2005/158132 A | 6/2005 |
| JP | 2007229614 A | 9/2007 |

OTHER PUBLICATIONS

Office Action dated Aug. 6, 2019, issued by Intellectual Property Corporation of Malaysia for corresponding Application No. PI 201400426, filed Feb. 17, 2014.

* cited by examiner

METHOD OF CLEANING MAGNETIC HEAD SLIDERS

CROSS-REFERENCE

This application is a divisional application of U.S. application Ser. No. 13/780,461 filed Feb. 28, 2013, the entire disclosure of which is incorporated herein by reference for all purposes.

BACKGROUND

Hard disc drive systems (HDDs) typically include one or more data storage discs and a magnetic transducing head carried by a slider to read from and write to a data track on a disc.

The reduction of the disc drive size and increase of the storage capacity are continuous goals of the industry. If dust, a gasified organic matter or any other contaminant adheres to the magnetic head slider, the reliability of the disc drive may be deteriorated. Thus, high cleanness is desired. Because of this, the magnetic head slider is subjected to thorough cleaning in the final manufacturing stage. Generally, the cleaning includes a step of washing off the contaminant adhering to the magnetic head slider with use of a cleaning solution, a rinsing step of washing off the adhering cleaning solution with rinsing liquid, and a drying step of drying the resulting adhering rinsing liquid. Sometimes, depending on the contaminant, its position on the slider, and the cleaning process used, not all contaminants are removed.

Improved cleaning processes are desired.

SUMMARY

The present disclosure provides methods for cleaning debris from magnetic head sliders.

One particular embodiment of this disclosure is a method that includes dislodging particulate debris from a surface of a magnetic slider by contacting the surface of the slider with an oscillating brush, enveloping the dislodged particulate debris in a foam, and removing the enveloped particulate debris by removing the foam from the magnetic slider.

Another particular embodiment of this disclosure is a method that includes providing a plurality of magnetic sliders on a carrier, applying a film of an aqueous solution on the plurality of magnetic sliders, oscillating a brush in contact with the sliders, and creating foam from the aqueous solution and the oscillating brush. The aqueous solution includes a surfactant.

Another particular embodiment of this disclosure is a method that includes oscillating a brush in a first direction across and in contact with a slider in the presence of an aqueous solution, the oscillating brush creating a foam on the slider, and moving at least one of the slider and brush in relation to each other in a second direction orthogonal to the first direction. The aqueous solution includes surfactant.

These and various other features and advantages will be apparent from a reading of the following detailed description.

BRIEF DESCRIPTION OF THE DRAWING

The disclosure may be more completely understood in consideration of the following detailed description of various embodiments of the disclosure in connection with the accompanying drawing, in which.

DETAILED DESCRIPTION

The present embodiments relate most generally to methods of cleaning magnetic elements by utilizing an oscillating brush to remove particulate debris from the magnetic elements. It is the combination of the oscillating brush with an aqueous solution that provides excellent removal of particulate debris from the surface of magnetic elements. The high frequency, oscillating bristles physically contact and remove particulate debris from all levels of the magnetic element surface, while foam created by the oscillating bristles envelopes, isolates and transports the debris away from the surface.

In the following description, reference is made to the accompanying drawing that forms a part hereof and in which are shown by way of illustration at least one specific embodiment. The following description provides additional specific embodiments. It is to be understood that other embodiments are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples provided below.

Unless otherwise indicated, all numbers expressing feature sizes, amounts, and physical properties are to be understood as being modified by the term "about." Accordingly, unless indicated to the contrary, the numerical parameters set forth are approximations that can vary depending upon the desired properties sought to be obtained by those skilled in the art utilizing the teachings disclosed herein.

As used herein, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

Figure 1:
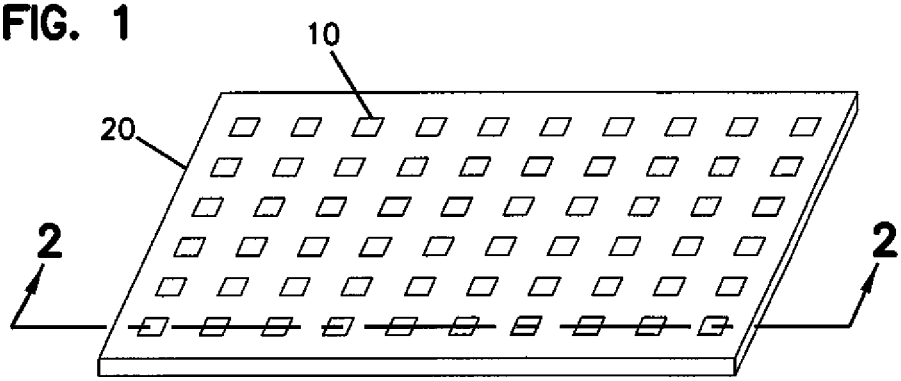
FIG. 1 is a schematic, perspective view of a plurality of sliders held in a carrier.
Figure 2:
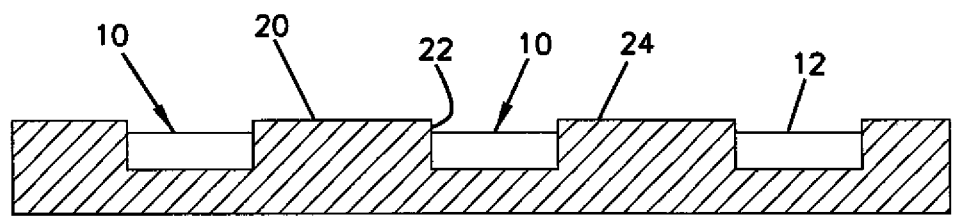
FIG. 2 is a cross-sectional view taken along line 2-2 of FIG. 1.

Referring to FIGS. 1 and 2, a plurality of magnetic elements (e.g., sliders) is illustrated, packaged in preparation for cleaning. Particularly, a plurality of sliders 10 are illustrated retained on or in a carrier sheet 20. At this state, each of sliders 10 has been formed, lapped, and otherwise processed so that each slider 10 has an air bearing surface, rails, and the appropriate elements to read from and write to a data track on a disc. Any contamination, such as particulate debris and/or organic or other chemical contamination or films, are present on slider 10 at this stage. See, for example, FIG. 3, which illustrates slider 10 with a top surface 12 having raised area 14 and recessed area 16. Raised area 14 and recessed area 16 have a difference in elevation of less than a few micrometers.

Figure 3:
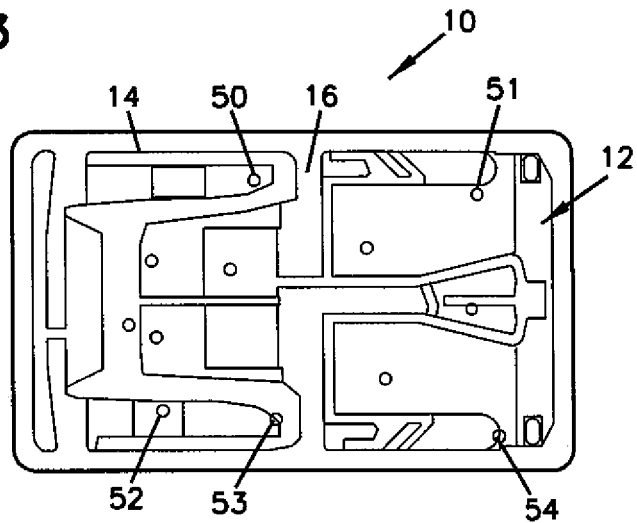
FIG. 3 is an enlarged top view of a slider having particulate debris thereon.

In FIG. 3, numerous particles or other debris are present on top surface 12 as debris 50, 51, 52, 53, 54, etc. Debris 50, etc., may be any undesired material, and examples of common materials include silicon, silicon oxide and other oxides, abrasive particles (e.g., alumina, diamond or ceria), metal (e.g., copper, gold, stainless steel), and organic adhesives and tape debris. An exemplary slider 10 has dimensions of approximately 700 micrometers by 1200 micrometers. Particulate debris 50, etc., typically has a diameter from several nanometers in size to about 5 micrometers, although larger and smaller debris is not unknown.

Returning to FIGS. 1 and 2, sliders 10 are retained in cavities 22 present in carrier 20 in preparation for final cleaning. Sliders 10 are recessed in carrier 20 with top surface 12 non-level with an upper surface 24 of carrier 20. Typically, top surface 12 is approximately 50 to 100 micrometers (e.g., 75 micrometers) below upper surface 24 of carrier 20.

Figure 4:
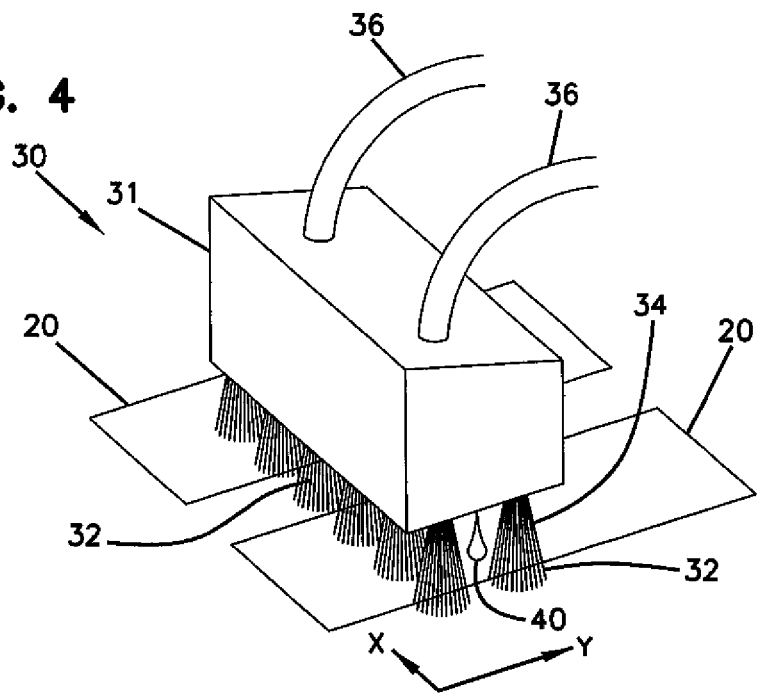
FIG. 4 is a schematic, perspective view of a washing apparatus for cleaning sliders according to an embodiment of the present disclosure.
Figure 6:
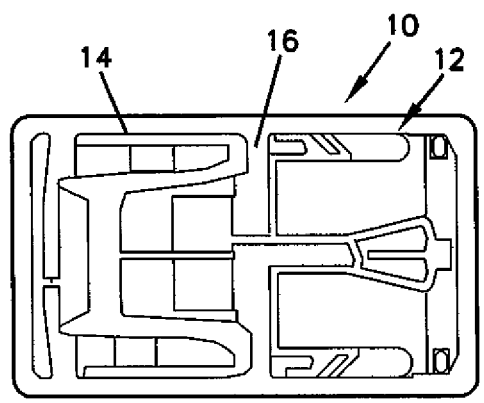
FIG. 6 is an enlarged top view of a clean slider cleaned according to an embodiment of the present disclosure.
Figure 5:
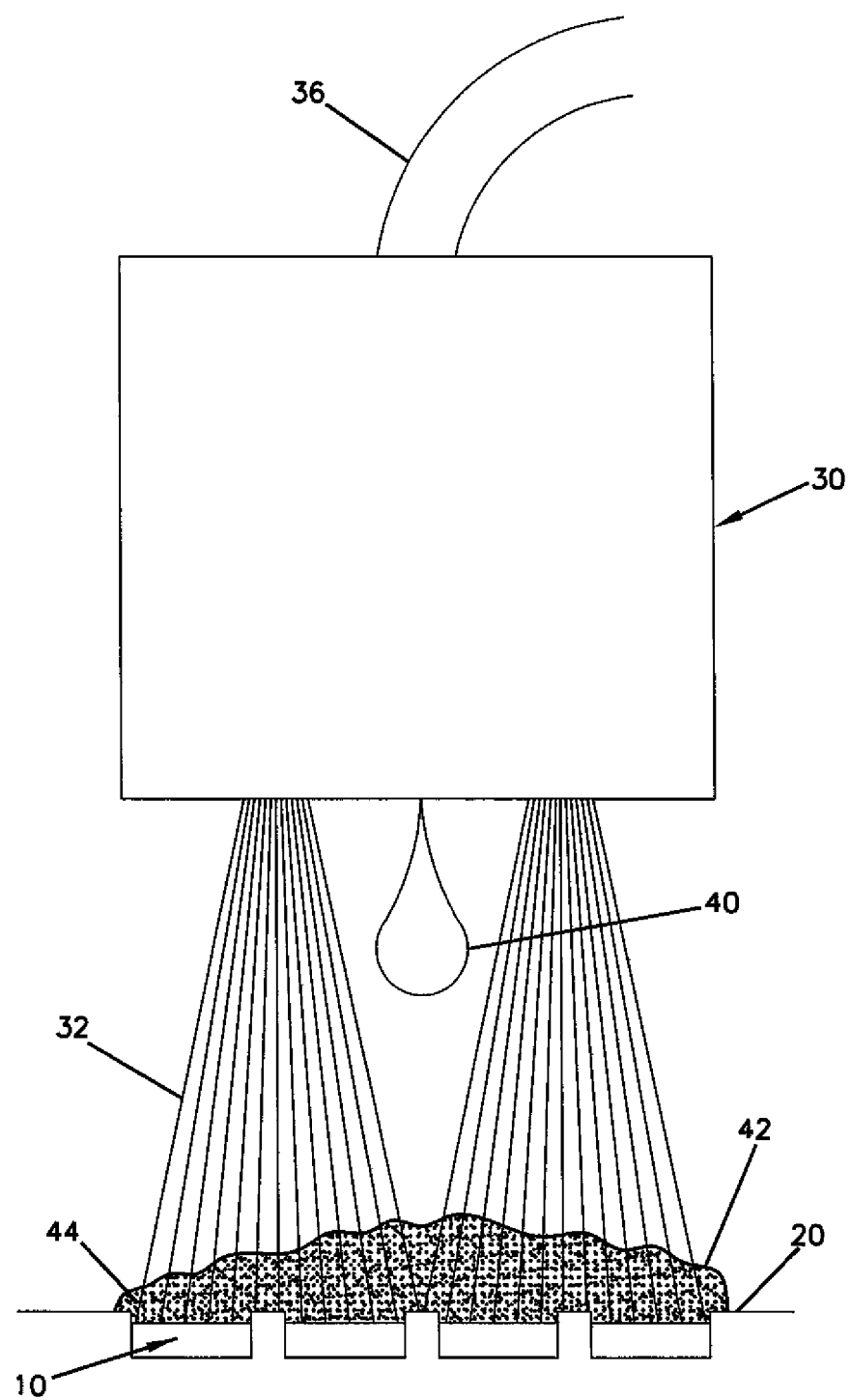
FIG. 5 is an end view of the washing apparatus of FIG. 4.

The methods of this disclosure utilize a combination of an oscillating brush (composed of a plurality of bristles) and an aqueous solution that may include a foaming agent, such as a surfactant. The high frequency oscillation of the brush across surface 12 of slider 10 provides a high contact area, providing a high probability that the entire surface 12 is contacted by the bristles so that debris is removed therefrom. Additionally, the high frequency oscillation of the bristles across surface 12 agitates the aqueous solution, forming an air bubble-filled foam. Once removed from surface 12, the debris is enveloped by the foam and carried away from surface 12. In some embodiments, the foam may electrostatically isolate the debris, inhibiting its redeposition onto surface 12 of slider 10. FIGS. 4 and 5 illustrate an embodiment of a method according to this disclosure utilizing a brush 30 to clean sliders 10 in carriers 20.

In the embodiment of FIGS. 4 and 5, brush 30 has a body 31 supporting a plurality of bristles 32, brush 30 having a length in the x-direction sufficiently long to span multiple carriers 20 with sliders 10 therein. In use, brush 30 oscillates in the x-direction as sliders 10 and carriers 20 move relative to brush 30 in the y-direction. In some embodiments, brush 30 is stationary in the y-direction while carriers 20 move, whereas in other embodiments, brush 30 moves in the y-direction while carriers 20 are stationary, and in yet other embodiments, both brush 30 and carriers 20 move in the y-direction, either in opposite directions or in the same direction but at different speeds. As an example, brush 30 and carriers 20 may move at a speed of about 0.1 inch/sec relative to each other.

Brush 30 oscillates within the range of 100 to 500 Hz with a displacement of 100 to 500 micrometers. In some embodiments, the oscillation is within the range of 150-250 Hz, e.g., 150-170 Hz. Typically, the amplitude of oscillation is less than 50% of the slider dimension in the oscillation direction. Thus, for example, oscillation amplitude is less than 350 micrometers across a slider having a width of 700 micrometers, or less than 500 micrometers across a slider having a width of 1000 micrometers.

Brush 30 is composed of a plurality of flexible bristles 32, in the illustrated embodiment, arranged into tufts 34. Bristles 32 are a polymeric material, such as a thermoset, a thermoplastic (e.g., a thermoplastic elastomer) or a combination thereof. Examples of suitable polymeric materials include thermoset polyurethanes, thermoplastic polyurethanes and combinations thereof, thermoplastic polyacrylonitriles (e.g., acrylic) and acrylic elastomers, thermoplastic polyamides (e.g., nylon), and polypropylene.

Each bristle 32 has a diameter of about 50 to 125 micrometers (e.g., 75 to 125 micrometers) and a length of about ½ inch to 1 inch, although in some embodiments, longer or shorter bristles 32 can be used. In some embodiments, each bristle has a diameter of about 75-200 micrometers, e.g., about 100-150 micrometers. Bristles 32 may be straight, tapered, or crimped. Bristles 32 may be sufficiently pliable and flexible to bend slightly during use, however, the desired contact with sliders 10 is with the tip of bristles 32 rather than a side thereof.

Multiple bristles 32 may be arranged in tufts 34, as illustrated in FIGS. 4 and 5, or brush 30 may have a consistent density of bristles 32 across its length and/or width. Tufts of bristles may be arranged offset or staggered in the y-direction, or may be straight or aligned in the y-direction. Similarly, tufts of bristles may be arranged offset or staggered in the x-direction, by in most embodiments are straight or aligned in the x-direction.

One exemplary brush 30 has tufted straight nylon bristles 32 that are approximately 125 micrometers in diameter and about ¾ inch long. The tufts form three straight lines in the x-direction and are aligned in the y-direction. When oscillated in the x-direction at 150 to 170 Hz, each bristle 32 moves 100-500 micrometers of distance in the x-direction, for example, at a speed of about 4000 mm/sec.

When cleaning sliders 10, an aqueous solution is used in combination with the oscillating brush 30. The brush and sliders are not submerged in the solution, but rather, a thin film layer of the solution is provided at the interface between bristles 32 and carrier 20 and sliders 10.

As seen in FIGS. 4 and 5, brush 30 includes a liquid feed 36 connected to a source of aqueous solution. Liquid feed 36, in this illustrated embodiment, drips aqueous solution 40 through brush 30 between tufts 34 of bristles 32. The solution is thus applied to the area where bristles 32 contact carrier 20 and sliders 10. In other embodiments, the solution can be sprayed onto the desired area, for example, at an angle from a side of brush 30. The flow rate of aqueous solution 40 is not critical, as long as sufficient solution is present to provide a film of solution at the interface of bristles 32 and carrier 20 without submerging carrier 20. Additionally, the flow of solution 40 is sufficiently constant to provide a constant supply of clean solution to the bristle-carrier interface.

Aqueous solution 40 may include any of water (e.g., distilled water, deionized (DI) water), organic solvent, inorganic solvent, and mixtures thereof. Examples of suitable solvents include acetone, isopropyl alcohol (IPA), ethanol, cyclohexane, although other solvents could be used. One exemplary suitable solvent solution is 5% IPA in DI water.

It has been found that the high frequency agitation of the bristles creates a turbulent flow, facilitating the removal of debris from the surface of sliders 10 and the transport of debris away from sliders 10. Additionally, air bubbles form, also facilitating the removal of debris from the surface of sliders 10 and the transport of debris away from sliders 10. See FIG. 5, where foam 42 is illustrated proximate slider 10.

In some embodiments, the aqueous solution includes an additive that facilitates the formation of foam 42 and/or stabilizes the formed foam. Examples of suitable additives are surfactants, which reduce the surface tension of the solution, facilitating the incorporation and stabilization of the air bubbles 44 in foam 42. The surfactant may be anionic, nonionic, or zwitterionic (amphoteric). Examples of suitable surfactants include fluorosurfactants, siloxanes surfactants, and ethoxylated surfactants. The additive may be acidic, basic (alkaline), or have a neutral pH. In some embodiments, an alkaline additive is desired, because the resulting foam will have a negative overall charge. Several examples of suitable additives includes those available from International Products Corporation under the trade designations "Micro-90" and "Surface-Cleanse/930", from Valtech Corporation under the trade designation "Valtron", and from Crest Ultrasonics Corp. under the trade designation "Chemcrest."

The amount of additive may be as much as 10% of the solution, however, in most embodiments the amount of additive will be no greater than 5% or no greater than 3%. In some embodiments, levels of 1% and less (e.g., 0.5% and less) are sufficient to create and/or stabilize the foam.

Foam 42, which includes air bubbles 44 therein, envelopes the debris removed from surface 12 of sliders 10 by brush 30. The foam forms a physical barrier between the debris and surface 12, thus inhibiting its redeposition onto surface 12 of slider 10. Additionally, in some embodiments, foam 42 transfers to the debris a charge (e.g., an alkaline foam will transfer a negative charge to the enveloped debris), which further inhibits redeposition of the debris onto surface 12 of slider 10. Alternately, in some embodiments, foam 42 may electrostatically insulate and isolate the debris, inhibiting its redeposition onto surface 12 of slider 10. The entrained debris is carried away from sliders 10 as fresh aqueous solution 40 is applied to the bristle-carrier interface.

Figure 7:
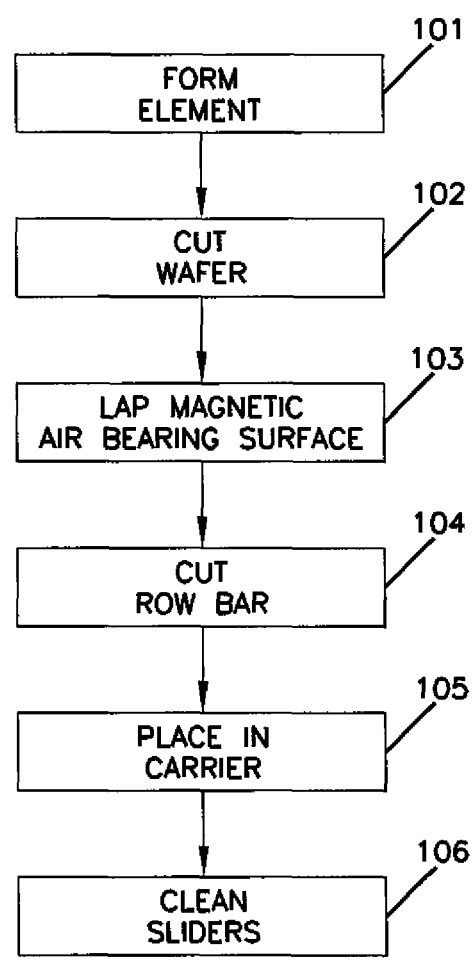
FIG. 7 is a process flow chart depicting a magnetic head slider fabrication method according to an embodiment of the present disclosure.

The present disclosure also provides a method for fabrication of a magnetic head slider. Referring to FIG. 7, in step 101, a plurality of magnetic head elements (e.g., sliders 10) are first formed on a base material (e.g., Si wafer) by conventional methods. In step 102, the wafer is then cut into strip-shaped row bars or slider bars, e.g., by a dicing saw. In step 103, the surface of the row bar which will become surface 12 of slider 10 is mechanically lapped to form an air bearing surface at the desired height by conventional methods, e.g., with a lapping plate embedded with diamond abrasive grains. The resulting surface may be covered with a protective film to inhibit corrosion on the air bearing surface and improve slidability of the slider during use. After the desired surface is obtained, the row bar is cut in step 104 to form individual sliders 10. After cutting into individual sliders 10, the sliders are placed on a carrier (e.g., carrier 20) in step 105, and then cleaned in step 106 by an oscillating brush in a manner consistent with this disclosure.

Thus, numerous embodiments of the METHOD OF CLEANING MAGNETIC HEAD SLIDER are disclosed. The implementations described above and other implementations are within the scope of the following claims. For example, the brush may oscillate in both the x-direction and the y-direction (e.g., in a rotary or random orbital manner) rather than in only one direction. As another example, each bristle or tuft may oscillate independent of the adjacent bristle or tuft. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A method of cleaning magnetic sliders, comprising:
   providing a carrier with a plurality of recessses arranged as a plurality of columns and a plurality of rows;
   providing a plurality of magnetic sliders in the recesses of the carrier with no more than one slider in a recess;
   applying an aqueous solution comprising a surfactant on the plurality of magnetic sliders on the carrier;
   oscillating a brush in contact with the sliders on the carrier to create foam from the aqueous solution and the oscillating brush; and
   removing the foam from the magnetic sliders.

2. The method of claim 1 further comprising moving at least one of the carrier and the brush in a direction orthogonal to the oscillation.

3. The method of claim 2 comprising moving both the carrier and the brush in a direction orthogonal to the oscillation.

4. The method of claim 1 wherein the step of oscillating comprises oscillating the brush at 100 to 500 Hz with a displacement of 100 to 500 micrometers.

5. The method of claim 1 wherein the step of applying an aqueous solution comprises applying aqueous solution by dripping.

6. The method of claim 1 wherein the step of applying an aqueous solution comprises applying aqueous solution by spraying.

7. The method of claim 1 wherein the aqueous solution comprises no more than 1% surfactant.

8. The method of claim 1 wherein the plurality of magnetic sliders are retained in recesses below a top surface of the carrier.

9. A method of cleaning magnetic sliders, comprising:
   providing a carrier with a plurality of recessses arranged as a plurality of columns and a plurality of rows;
   providing a plurality of magnetic sliders in the recesses of the carrier with no more than one slider in a recess;
   oscillating a brush in a first direction across and in contact with the plurality of sliders on the carrier in the presence of an aqueous solution comprising a surfactant, the oscillating brush together with the aqueous solution creating a foam on the sliders on the carrier; and
   moving at least one of the carrier and the brush in a second direction orthogonal to the first direction.

10. The method of claim 9 wherein the step of oscillating comprises oscillating the brush at 100 to 500 Hz.

11. The method of claim 9 wherein the step of oscillating comprises oscillating the brush at 150 to 200 Hz.

12. The method of claim 9 wherein the aqueous solution is dripped on the sliders through the brush.

13. The method of claim 12 wherein the dripping solution rinses the sliders.

14. The method of claim 9 wherein the carrier moves in the second direction.

15. The method of claim 14 wherein the oscillating brush moves in the second direction.

16. The method of claim 1 wherein the plurality of sliders are retained in the recesses with a top surface below a surface of the carrier in which the recesses are positioned.

17. The method of claim 1 wherein the carrier is a carrier sheet.

18. The method of claim 9 wherein the carrier is a carrier sheet.

* * * * *